US009499190B2

(12) United States Patent
Caverly et al.

(10) Patent No.: US 9,499,190 B2
(45) Date of Patent: Nov. 22, 2016

(54) ADJUSTABLE STEERING COLUMN ASSEMBLY HAVING SELF-DE-LASHING POWER-RAKE MECHANISM

(71) Applicant: Steering Solutions IP Holding Corporation, Saginaw, MI (US)

(72) Inventors: Jacob A. Caverly, Freeland, MI (US); Robert D. Maida, Pinconning, MI (US); Scott A. Stinebring, Auburn, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/640,527

(22) Filed: Mar. 6, 2015

(65) Prior Publication Data
US 2015/0251683 A1    Sep. 10, 2015

Related U.S. Application Data

(60) Provisional application No. 61/948,805, filed on Mar. 6, 2014.

(51) Int. Cl.
*B62D 1/181*    (2006.01)
*B62D 1/189*    (2006.01)
*B62D 1/187*    (2006.01)

(52) U.S. Cl.
CPC .............. *B62D 1/181* (2013.01); *B62D 1/187* (2013.01); *B62D 1/189* (2013.01)

(58) Field of Classification Search
CPC ....... B62D 1/181; B62D 1/189; B62D 1/187
See application file for complete search history.

(56) References Cited

U.S. PATENT DOCUMENTS

| | | | |
|---|---|---|---|
| 3,501,993 A | 3/1970 | Swenson | |
| 5,722,299 A * | 3/1998 | Yamamoto | B62D 1/184 280/775 |
| 5,848,557 A | 12/1998 | Sugiki et al. | |
| 6,142,485 A | 11/2000 | Muller et al. | |
| 6,328,343 B1 | 12/2001 | Hosie et al. | |
| 7,516,991 B1 | 4/2009 | Cheng | |
| 8,935,968 B2 | 1/2015 | Sugiura | |
| 9,022,426 B2 | 5/2015 | Sakata | |
| 9,022,427 B2 * | 5/2015 | Schnitzer | B62D 1/16 280/775 |
| 2003/0185648 A1 | 10/2003 | Blaess | |
| 2003/0209897 A1 | 11/2003 | Manwaring et al. | |

(Continued)

FOREIGN PATENT DOCUMENTS

JP          2011057020 A  *  3/2011  ............... B62D 1/18

*Primary Examiner* — Faye M Fleming
(74) *Attorney, Agent, or Firm* — Cantor Colburn LLP

(57) ABSTRACT

A self-de-lashing power-rake mechanism of an adjustable steering column assembly of a vehicle is provided. The power-rake mechanism includes a jacket, rake bracket coupled to the jacket, and rake bolt extending through the jacket and bracket. At least one pivot bushing is disposed between the jacket and bracket and configured to receive and radially constrict around the bolt. A fastener is configured to be positioned onto the bolt, tightened, and seated on the bracket. The bolt is forced through the fastener, bracket, bushing, and jacket. The bolt is seated on the bracket as the fastener is tightened and draws the bolt, fastener, bracket, bushing, and jacket together as the fastener is being seated on the bracket, thereby de-lashing respective interfaces defined between and among the bolt, fastener, bracket, bushing, and jacket. A steering column assembly including the mechanism is also provided.

18 Claims, 4 Drawing Sheets

(56) References Cited

U.S. PATENT DOCUMENTS

| | | |
|---|---|---|
| 2003/0227163 A1 | 12/2003 | Murakami et al. |
| 2004/0200306 A1* | 10/2004 | Schafer ............... B62D 1/181 74/493 |
| 2007/0137379 A1* | 6/2007 | Sanji ................ B62D 1/189 74/493 |
| 2007/0194563 A1 | 8/2007 | Menjak et al. |
| 2008/0106086 A1* | 5/2008 | Shimoda ............ B62D 1/189 280/775 |
| 2009/0200783 A1 | 8/2009 | Cymbal |
| 2012/0125139 A1 | 5/2012 | Tinnin et al. |
| 2012/0125140 A1 | 5/2012 | Ridgway et al. |
| 2013/0205933 A1* | 8/2013 | Moriyama ............ B62D 1/187 74/493 |
| 2014/0109713 A1 | 4/2014 | Bodtker |
| 2014/0109714 A1* | 4/2014 | Bodtker ............... B62D 1/184 74/493 |
| 2014/0137694 A1 | 5/2014 | Sugiura |
| 2014/0147197 A1 | 5/2014 | Yoshida et al. |
| 2015/0028574 A1 | 1/2015 | Meyer et al. |
| 2015/0166093 A1* | 6/2015 | Moriyama ............ B62D 1/189 74/493 |
| 2015/0232117 A1 | 8/2015 | Stinebring et al. |
| 2015/0239490 A1 | 8/2015 | Sakata |
| 2016/0046318 A1 | 2/2016 | Stinebring et al. |

* cited by examiner

ADJUSTABLE STEERING COLUMN ASSEMBLY HAVING SELF-DE-LASHING POWER-RAKE MECHANISM

CROSS-REFERENCE TO RELATED APPLICATION

This application is based upon and claims benefit of the filing date of U.S. Provisional Patent Application 61/948,805 filed on Mar. 6, 2014 and entitled "Self-De-Lashing Power-Rake Mechanism," which is incorporated herein by reference in its entirety.

FIELD OF INVENTION

The invention relates generally to a steering column assembly of a vehicle and, more particularly, to a steering column power-rake assembly for increasing static stiffness of the steering column assembly during such adjustment.

BACKGROUND

A steering column assembly of a vehicle adjustable in a rake (tilt) direction typically includes a power-rake assembly or mechanism. A series of several components or parts of the power-rake mechanism must be radially and laterally de-lashed to one another to ensure a quality, lash-free feel and performance of the steering column assembly during such adjustment. More specifically, joints between and among the components must be held sufficiently rigidly together to be lash-free, but not too rigid as to inhibit the adjustment. Thus, the joints must be able to be tuned.

Accordingly, it is desirable to provide lash-free joints between and among a series of several components of the power-rake mechanism and ensure the de-lashing thereof.

SUMMARY OF INVENTION

In accordance with a non-limiting exemplary embodiment of the invention, a self-de-lashing power-rake mechanism of a steering column assembly of a vehicle is provided. The power-rake mechanism includes a jacket, a rake bracket coupled to the jacket, and a rake bolt extending through the jacket and rake bracket. At least one pivot bushing is disposed between the jacket and rake bracket and configured to receive and radially constrict around the rake bolt. A fastener is configured to be positioned onto the rake bolt, tightened, and seated on the rake bracket. The rake bolt is forced through the fastener, rake bracket, pivot bushing, and jacket. The rake bolt is seated on the rake bracket as the fastener is tightened and draws the rake bolt, fastener, rake bracket, pivot bushing, and jacket together as the fastener is being seated on the rake bracket, thereby de-lashing respective interfaces defined between and among the rake bolt, fastener, rake bracket, pivot bushing, and jacket. A steering column assembly including the power-rake mechanism is also provided.

In the embodiment, the power-rake mechanism is a series of components or parts that facilitate hand-assembly of the power-rake mechanism. The components also are compatible with a simple single torque-driving operation, mechanically de-lashing radially and laterally every interface within the series when they are torqued, and able to be tuned to achieve a targeted torque to rotate the power-rake mechanism.

Also in the embodiment, the power-rake mechanism is radially and laterally de-lashed without using multiple components, operations, and processes to achieve lash-free joints between and among a series of the components of the power-rake mechanism and ensure the de-lashing thereof. More specifically, the power-rake mechanism involves a limited number of components and the torque-driving operation to de-lash the power-rake mechanism both vertically and laterally. The power-rake mechanism also provides a series of easy lash-free joints to connect a bell-crank mechanism of the rake bracket to a pivot axis of the jacket. The power-rake mechanism also simplifies a process of assembly thereof by eliminating redundant components and expensive processes and implementing easy assembly of the components to each other and the torque-driving operation. The power-rake mechanism also allows for hand-assembly of several of the components together that de-lash a complete rake-pivot joint vertically and laterally when the torque-driving operation takes place. The power-rake mechanism also provides for static stiffness of the steering column assembly.

BRIEF DESCRIPTION OF EACH FIGURE OF DRAWING

The subject matter regarded as the invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION OF EMBODIMENTS OF INVENTION

Figure 1:
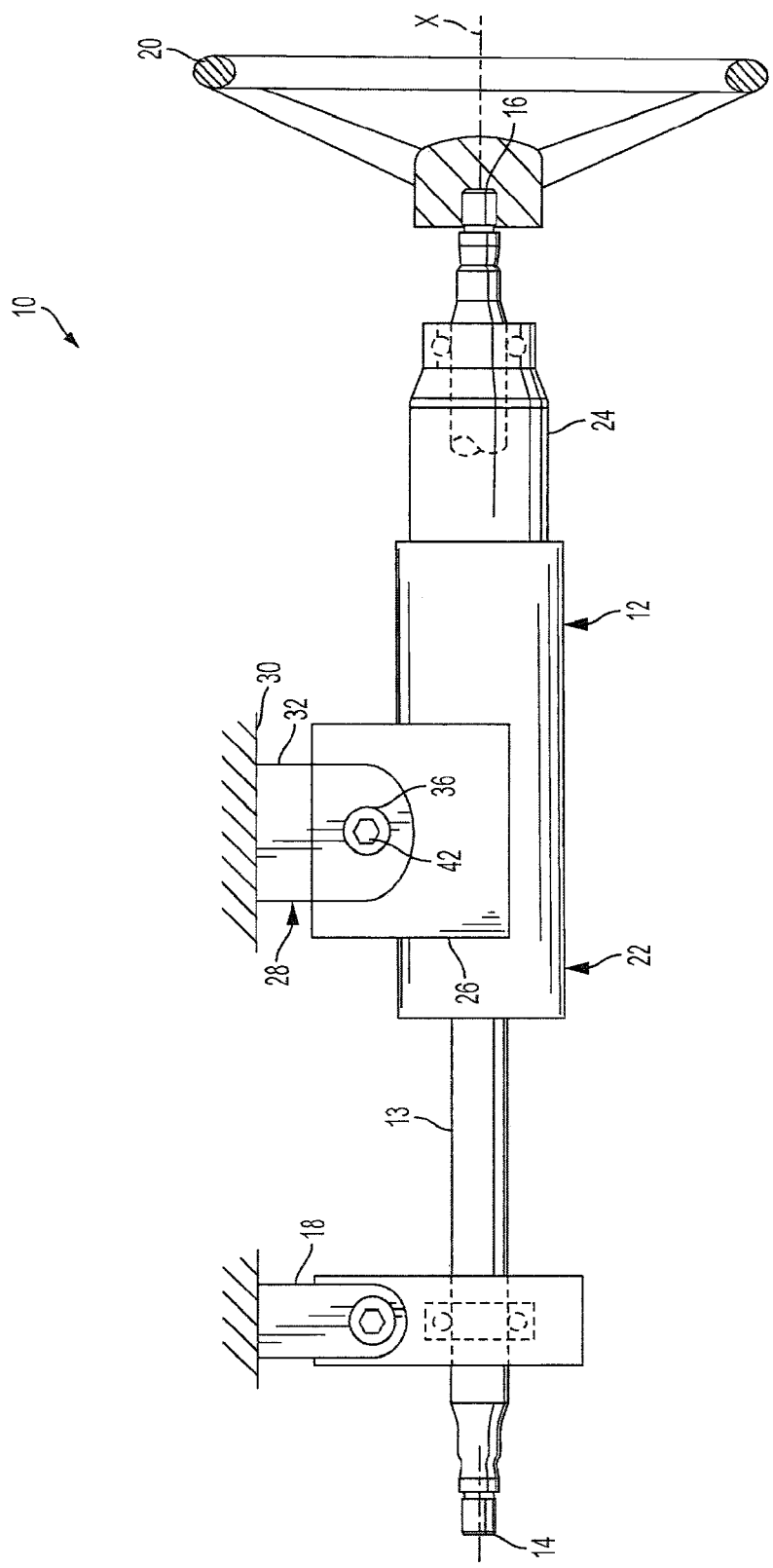
FIG. 1 is a schematic elevational view of a non-limiting exemplary embodiment of a steering column assembly.

Referring now to the Figures, wherein like numerals indicate corresponding parts throughout the several views, the invention is described below with reference to specific exemplary embodiments thereof without limiting same. Referring to FIG. 1, a steering column assembly is generally indicated at 10. The steering column assembly 10 is for a vehicle and extends along a longitudinal axis "X." The steering column assembly 10 also is adjustable in both a rake direction generally transverse to the longitudinal axis "X" (tilt) and a telescopic direction generally parallel with the longitudinal axis "X" (i.e., adjustable along the longitudinal axis "X").

The steering column assembly 10 includes a column-jacket assembly, generally indicated at 12, and a steering-column shaft 13 extending from a forward end 14 to a distal end 16 along the longitudinal axis "X." A steering wheel 20 is mounted to the distal end 16 of the steering-column shaft 13 as is well known in the related art. The column-jacket assembly 12 also includes an articulating lower (or outer) jacket, generally indicated at 22, and an upper (or inner) jacket 24 in telescopic engagement with the lower jacket 22. During an emergency event, such as a crash of the vehicle, the upper jacket 24 collapses into the lower jacket 22 as is well known in the related art. An energy-absorbing device (not shown) is coupled to the steering column assembly 10 to absorb energy transmitted through the column-jacket assembly 12 during collapse of the column jacket 12 assembly. There are many known energy-absorbing devices known in the related art suitable for use with the steering column assembly 10.

The support bracket 18 is for attachment to the vehicle, and the steering-column shaft 13 is coupled to the support bracket 18 and extends along the longitudinal axis "X." The support bracket 18 couples the steering-column shaft 13 to the vehicle. The support bracket 18 defines a rake axis "a." The steering-column shaft 13 is pivotably moveable relative to the support bracket 18 about the rake axis in the rake direction to adjust a position of the steering wheel 20. The steering column assembly 10 further includes a mounting bracket 26 mounted to the column-jacket assembly 12.

Figure 2:
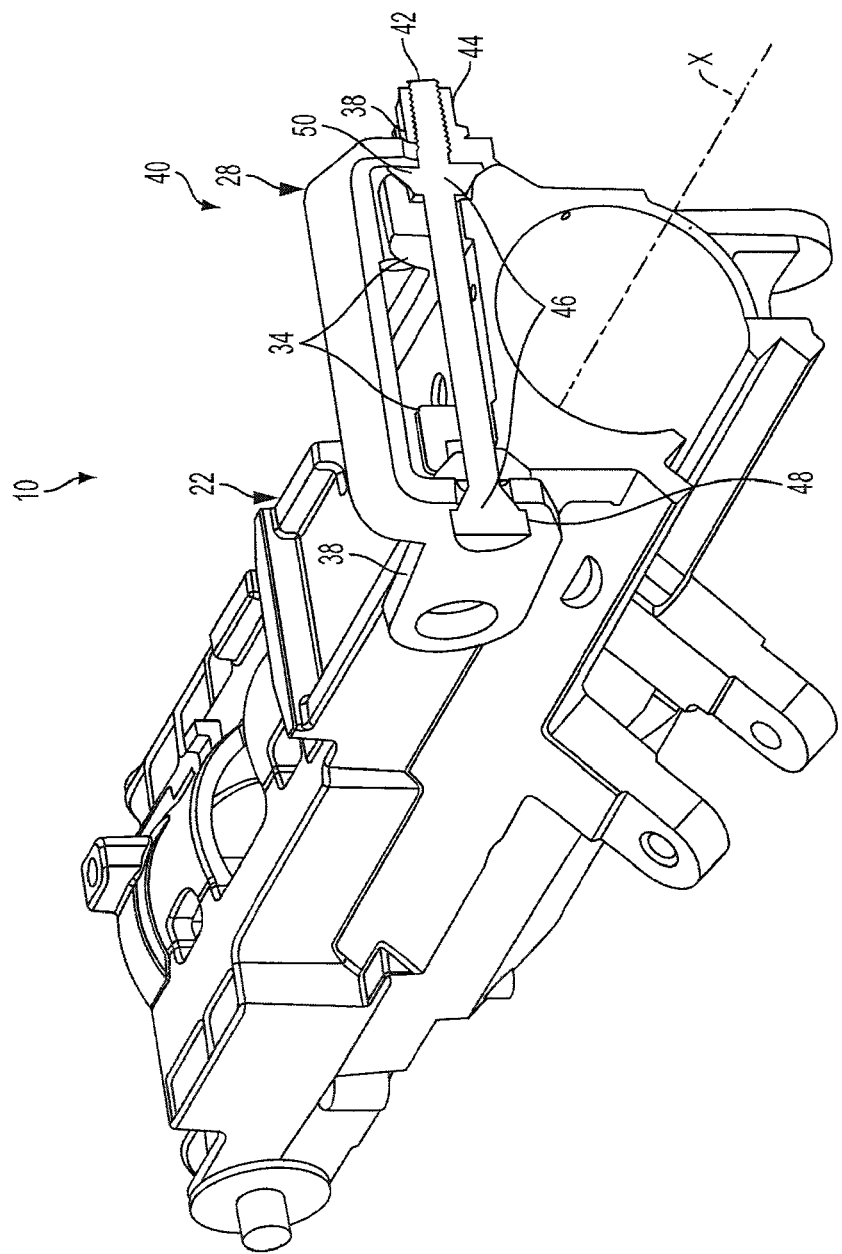
FIG. 2 is a perspective sectional view of an exemplary embodiment of a self-de-lashing power-rake mechanism according to the invention that can be implemented with the assembly illustrated in FIG. 1.
Figure 3:
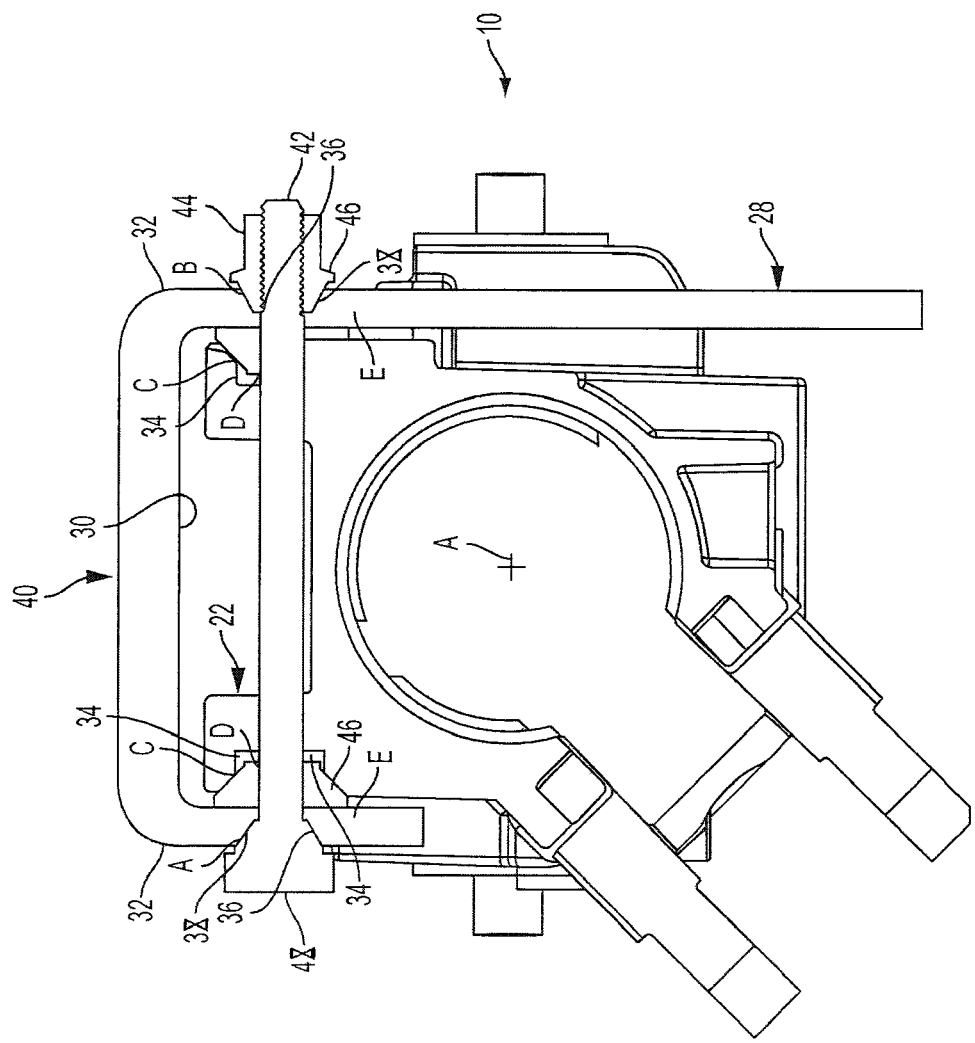
FIG. 3 is a front view of the mechanism illustrated in FIG. 2.

A rake bracket, generally indicated at 28, is coupled to the mounting bracket 26 and couples the column-jacket assembly 12 to the vehicle. The rake bracket 28 includes a top wall 30 spaced from the column jacket assembly 12 and a pair of arms 32 extending tangentially from opposed first and second sides of the top wall 30. At least one of the sides of the lower jacket 22 defines a tapered conical pocket 34 (FIGS. 2 and 3). In a version, the lower jacket 22 defines a pair of conical pockets 34 formed at the corresponding sides of the lower jacket 22.

The rake bracket 28 also defines rake slots 36 oriented transversely to the longitudinal axis "X." In the embodiment illustrated in FIG. 3, a first rake slot 36 is defined within a first arm 32 of the rake bracket 28, and a second rake slot 36 is defined within a second arm 32. However, it should be appreciated that only one of the pair of arms 32 need define the rake slot 36.

The rake bracket 28 further defines at least one tapered pocket or seat 38 (FIGS. 2 and 3) and an internal "double-D" profile as an anti-rotation feature. As illustrated in FIG. 3, the rake bracket 28 defines a pair of tapered pockets 38 formed at the corresponding arms 32 of the rake bracket 28.

FIG. 2 is a perspective sectional view of an exemplary self-de-lashing power-rake mechanism according to the invention generally indicated at 40. The power-rake mechanism 40 is configured to be implemented with the steering column assembly 10 illustrated in FIG. 1.

FIGS. 2 and 3 show de-lashing components of this aspect. More specifically, the power-rake mechanism 40 includes a rake bolt 42 and a fastener 44. In a version of this aspect, the fastener 44 is a rake-retention or rake-bolt nut 44. The power-rake mechanism 40 also includes at least one pivot bushing 46, the lower jacket 22, and the rake bracket 28. (The lower jacket 22, rake bracket 28, rake bolt 42, rake-bolt nut 44, and pivot bushing 46 are collectively referred to hereinafter as "the components 22, 28, 42, 44, 46").

The rake bolt 42 defines a first end and a second end spaced from the first end and extends transversely to the longitudinal axis "X" through the rake slots 36. The first end of the rake bolt 42 defines a tapered head 48. The rake bolt 42 further defines a tapered section under the tapered head 48 and an external "double-D" profile as an anti-rotation feature.

The rake-bolt nut 44 is configured to be threaded onto the second end of the rake bolt 42. Toward this end, the rake-bolt nut 44 defines a corresponding tapered seating surface or section 50 shown in FIG. 2 upon which the rake bolt 42 is configured to be installed. The rake-bolt nut 44 is configured to be tightened, adjusted, and seated on a surface of the tapered pocket 38 of the second arm 32 of the rake bracket 28.

The pivot bushing 46 is substantially conical and defines a split radiating from an inner diameter to an outer diameter of the pivot bushing 46. In a version, there are a pair of opposed pivot bushings 46. Each pivot bushing 46 is disposed between a corresponding side of the lower jacket 22 and a corresponding arm 32 of the rake bracket 28. The pivot bushings 46 are also configured to matingly receive the rake bolt 42, and the rake bracket 28 is assembled over the pivot bushings 46.

For assembly and operation of the power-rake mechanism 40, the rake bolt 42 is inserted and installed into and through rake slot 36 of the rake bracket 28, pivot bushings 46, and lower jacket 22. More specifically, a surface of the tapered head 48 of the rake bolt 42 seats on the corresponding tapered pocket 38 of the first arm 32 of the rake bracket 28, de-lashing the rake bolt 42 to the rake bracket 28. Prior to installation of the rake-bolt nut 44 onto the rake bolt 42, clearance is defined between or among some of the components 22, 28, 42, 44, 46 vertically and laterally. In a version, the clearance is so defined among all of the components 22, 28, 42, 44, 46. However, as the rake-bolt nut 44 is installed on the rake bolt 42, the rake-bolt nut 44 seats on a surface of the tapered pocket 38 of the second arm 32 of the rake bracket 28 and begins to draw a series of the components 22, 28, 42, 44, 46 together.

As the components 22, 28, 42, 44, 46 are drawn together and the tapered head 48 of the rake bolt 42 seats on the tapered pocket 38 of the first arm 32 of the rake bracket 28, the pivot bushings 46 are forced and installed into the corresponding conical pockets 34 of the lower jacket 22 and radially constricted to clamp around the rake bolt 42. This action de-lashes an interface defined between the rake bolt 42 and lower jacket 22. As the rake-bolt nut 44 is finally seated, the surface of the tapered head 48 of the rake bolt 42 and tapered seating surface 50 of the rake-bolt nut 44 seat respectively on the tapered pockets 38 of the corresponding arms 32 of the rake bracket 28 and de-lash a consequent rake-bolt assembly to the rake bracket 28. This results in a rake-pivot joint that is substantially de-lashed.

The rake-bolt nut 44 is threaded onto the rake bolt 42 and tightened into the tapered pocket 38 of the second arm 32 of the rake bracket 28. As the rake-bolt nut 44 is tightened, both arms 32 of the rake bracket 28 are forced inward into the lower jacket 22, pushing the pivot bushings 46 into the corresponding conical pockets 34 of the lower jacket 22 and, thus, constricting the pivot bushings 46 around the rake bolt 42. Rake loads can be tuned simply by adjustment of the rake-bolt nut 44. All interfaces are, thus, de-lashed.

FIG. 3 is a front sectional view of the de-lashed interfaces of the power-rake mechanism 40 illustrated in FIG. 2. In particular, "A" indicates the de-lashed interface between the rake bolt 42 and rake bracket 28 (more specifically, the surface of the tapered head 48 of the rake bolt 42 and the tapered pocket 38 of the first arm 32 of the rake bracket 28). "B" indicates the de-lashed interface between the rake-bolt nut 44 and rake bracket 28 (more specifically, the tapered seating surface 50 of the rake-bolt nut 44 and the tapered pocket 38 of the second arm 32 of the rake bracket 28). "C" indicates the pair of de-lashed interfaces between the pivot bushings 46 and lower jacket 22 (more specifically, the pivot bushings 46 and the corresponding conical pockets 34 of the lower jacket 22). "D" indicates the pair of de-lashed interfaces between the pivot bushings 46 and rake bolt 42. "E"

indicates the pair of lateral de-lashed interfaces between the rake bracket 28 and pivot bushings 46.

In the aspect illustrated in FIGS. 2 and 3, the rake bolt 42 is keyed to the rake bracket 28 so that the rake bolt 42 rotates with the rake bracket 28 relative to the lower jacket 22. The rake bolt 42 defines the tapered section under the tapered head 48 to seat and de-lash to the rake bracket 28. The pivot bushings 46 seat in the corresponding conical pockets 34 in the lower jacket 22. The conical nature of each pivot bushing 46 de-lashes the interface between the pivot bushing 46 and rake bolt 42 as the rake-bolt nut 44 is tightened and a conical section of the pivot bushing 46 is pulled into the seat of the corresponding conical pocket 34 in the lower jacket 22. This action constricts the inner diameter of the pivot bushing 46 around an outer diameter of the rake bolt 42.

The rake-bolt nut 44 features the tapered seating surface 50 that seats into the tapered pocket 38 in the second arm 32 of the rake bracket 28. As the rake-bolt nut 44 is tightened, the rake-bolt nut 44 draws the rake bolt 42, rake bracket 28, and pivot bushings 46 together. This constricts the pivot bushings 46 around the rake bolt 42 and eliminates the clearance between and among all of the components 22, 28, 42, 44, 46 vertically and laterally.

Figure 4:
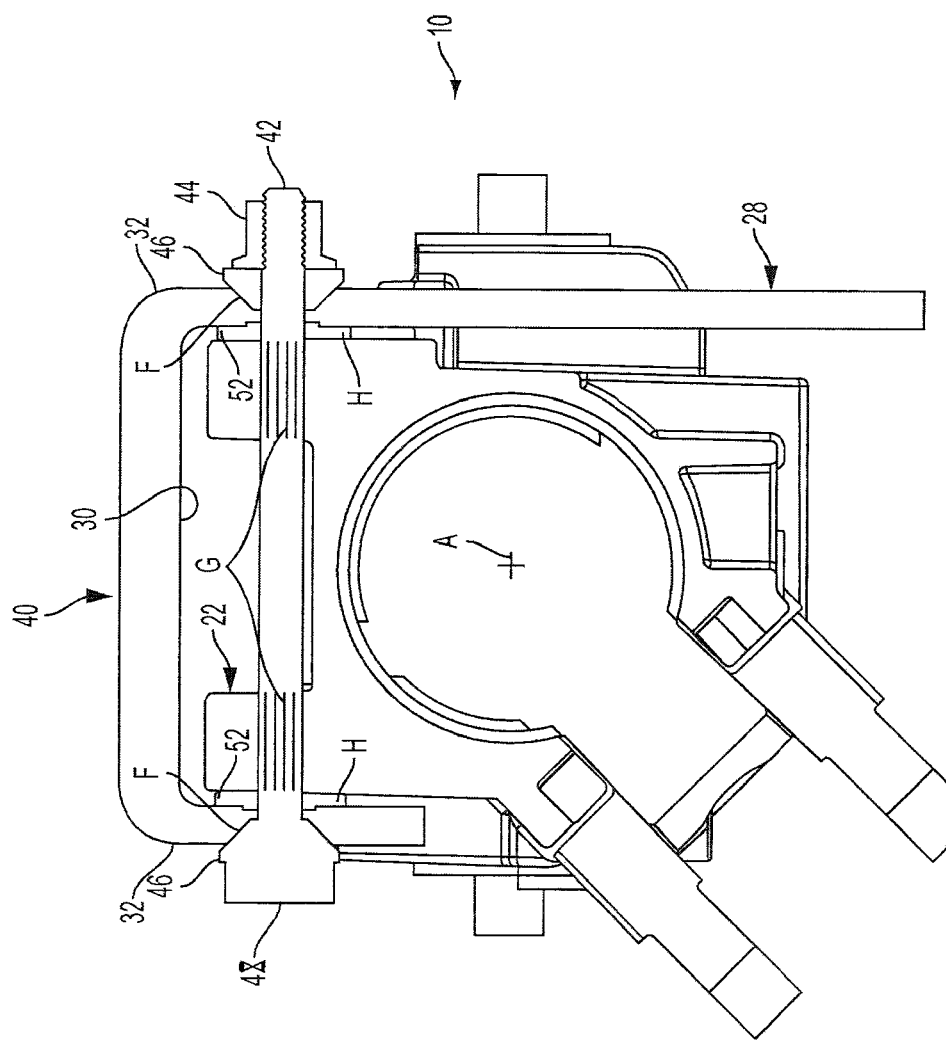
FIG. 4 is a front sectional view of another embodiment of the self-de-lashing power-rake mechanism.

FIG. 4 is a diagram showing a front view of another embodiment of the power-rake mechanism 40. More specifically, the figure shows de-lashed interfaces of this aspect.

In particular, "F" indicates each pivot bushing 46 seated in the corresponding tapered pocket 38 in the rake bracket 28. The conical nature of the pivot bushing 46 de-lashes the corresponding interface between the rake bolt 42 and rake bracket 28 as the rake-bolt nut 44 is tightened and a conical section of the pivot bushing 46 is pulled into the seat of the corresponding tapered pocket 38 in the rake bracket 28. This action constricts the inner diameter of the pivot bushing 46 around the outer diameter of the rake bolt 42.

"G" indicates the rake bolt 42 keyed (i.e., a profile defined by a knurl, square, hex, etc.) and pressed into the lower jacket 22. The tapered section under the tapered head 48 of the rake bolt 42 is eliminated (vis-á-vis the aspect illustrated in FIGS. 2 and 3).

"H" indicates at least one thrust bushing 52 disposed between the rake bracket 28 and a corresponding side of the lower jacket 22 to provide a compliant bearing surface. In a version illustrated in FIG. 4, a pair of thrust bushings 52 are added between the rake bracket 28 and, respectively, the sides of the lower jacket 22 to provide corresponding compliant bearing surfaces.

As the rake-bolt nut 44 is tightened, the rake-bolt nut 44 draws the rake bolt 42, pivot bushings 46, and rake bracket 28 together, constricting the pivot bushings 46 around the rake bolt 42 and eliminating the clearance between and among all of the components 22, 28, 42, 44, 46 vertically and laterally. Compared to the aspect illustrated in FIGS. 2 and 3, the tapered seating surface is eliminated from the rake-bolt nut 44.

The power-rake mechanism 40 shown in FIGS. 2-4 is a series of components or parts 22, 28, 42, 44, 46 that facilitate hand-assembly of the power-rake mechanism 40. The components 22, 28, 42, 44, 46 also are compatible with a simple single torque-driving operation, mechanically de-lashing radially and laterally the interfaces within the series when they are torqued, and are able to be tuned to achieve a targeted torque to rotate the power-rake mechanism 40.

Another non-limiting exemplary embodiment of the power-rake mechanism 40 may not include the pivot bushing(s) 46 and the rake bolt 42 and rake-bolt nut 44 may not necessarily be seated on the rake bracket 28. Toward that end, the rake bracket 28 is coupled to the lower jacket 22, and the rake bolt 42 extends through the jacket 22 and rake bracket 28. The rake-bolt nut 44 is configured to be positioned onto the rake bolt 42 and draw the rake bolt 42, rake-bolt nut 44, rake bracket 28, and jacket 22 together as the rake-bolt nut 44 is tightened. In this way, respective interfaces defined between and among the rake bolt 42, rake-bolt nut 44, rake bracket 28, and jacket 22 are de-lashed.

The power-rake mechanism 40 is radially and laterally de-lashed to achieve the lash-free joints between and among the series of the components 22, 28, 42, 44, 46 of the power-rake mechanism 40 and ensure the de-lashing of the power-rake mechanism 40. More specifically, the power-rake mechanism 40 involves a limited number of components and the torque-driving operation to de-lash the power-rake mechanism 40 both vertically and laterally. Also, the power-rake mechanism 40 provides a series of easy lash-free joints to connect a bell-crank mechanism of the rake bracket 28 to the pivot axis "X" of the lower jacket 22. Furthermore, the power-rake mechanism 40 simplifies a process of assembly of the power-rake mechanism 40 by eliminating redundant components and expensive processes and implementing easy assembly of the components 22, 28, 42, 44, 46 to each other and the torque-driving operation. In addition, the power-rake mechanism 40 allows for hand-assembly of several of the components 22, 28, 42, 44, 46 together that de-lash a complete rake-pivot joint vertically and laterally when the torque-driving operation takes place. Moreover, the power-rake mechanism 40 provides for static stiffness of the steering column assembly 10.

While the invention has been disclosed herein in detail in connection with only a limited number of exemplary embodiments, it should be readily understood that the invention is not limited to such embodiments. Rather, the invention can be modified to incorporate any number of variations, alterations, substitutions, or equivalent arrangements not heretofore disclosed, but that are commensurate with the spirit and scope of the invention. Additionally, while various non-limiting exemplary embodiments of the invention have been disclosed herein, it is to be understood that aspects of the invention may include only some of these embodiments. Accordingly, the invention is not to be seen as limited by the foregoing disclosure.

Having thus described the invention, it is claimed:

1. A self-de-lashing power-rake mechanism of an adjustable steering column assembly comprising:
   a jacket;
   a rake bracket coupled to the jacket, the rake bracket defining at least one tapered pocket;
   a rake bolt extending through the jacket and rake bracket, the rake bolt defining a tapered head seated on the at least one tapered pocket;
   at least one pivot bushing disposed between the jacket and rake bracket and configured to receive and radially constrict around the rake bolt; and
   a fastener configured to be positioned onto the rake bolt, tightened, and seated on the rake bracket, the rake bolt being forced through the fastener, rake bracket, pivot bushing, and jacket and the rake bolt being seated on the rake bracket as the fastener is tightened and draws the rake bolt, fastener, rake bracket, pivot bushing, and jacket together as the fastener is being seated on the rake bracket, thereby de-lashing respective interfaces defined between and among the rake bolt, fastener, rake bracket, pivot bushing, and jacket.

2. The power-rake mechanism of claim 1, wherein the fastener is tapered and seats on a tapered pocket of the rake bracket.

3. The power-rake mechanism of claim 2, wherein the fastener is positioned onto the rake bolt and tightened into the tapered pocket of the rake bracket.

4. The power-rake mechanism of claim 1, wherein sides of the rake bracket are forced inward into the jacket as the fastener is tightened, pushing the pivot bushing into a tapered pocket of the jacket.

5. The power-rake mechanism of claim 1, wherein the pivot bushing is forced and installed into a conical pocket of the jacket and radially constricted to clamp around the rake bolt.

6. The power-rake mechanism of claim 1, wherein at least one thrust bushing is positioned between the rake bracket and jacket to provide a compliant bearing surface.

7. An adjustable steering column assembly comprising:
  a self-de-lashing power-rake mechanism including:
    a jacket;
    a rake bracket coupled to the jacket, the rake bracket defining at least one tapered pocket;
    a rake bolt extending through the jacket and rake bracket;
    at least one thrust bushing disposed between the rake bracket and the jacket configured to provide a compliant bearing surface;
    at least one pivot bushing seated in the at least one tapered pocket, the at least one pivot bushing configured to receive and radially constrict around the rake bolt; and
    a fastener configured to be positioned onto the rake bolt, tightened, and seated on the rake bracket, the rake bolt being forced through the fastener, rake bracket, pivot bushing, and jacket and the rake bolt being seated on the rake bracket as the fastener is tightened and draws the rake bolt, fastener, rake bracket, pivot bushing, and jacket together as the fastener is being seated on the rake bracket, thereby de-lashing respective interfaces defined between and among the rake bolt, fastener, rake bracket, pivot bushing, and jacket.

8. The adjustable steering column assembly of claim 7, wherein the rake bolt includes a tapered head seated on a tapered pocket of the rake bracket.

9. The adjustable steering column assembly of claim 7, wherein sides of the rake bracket are forced inward into the jacket as the fastener is tightened, pushing the pivot bushing into a tapered pocket of the jacket.

10. The adjustable steering column assembly of claim 7, wherein the pivot bushing is forced and installed into a conical pocket of the jacket and radially constricted to clamp around the rake bolt.

11. The adjustable steering column assembly of claim 7, wherein at least one thrust bushing is positioned between the rake bracket and jacket to provide a compliant bearing surface.

12. The adjustable steering column assembly of claim 7, wherein the assembly further comprises a support bracket for attachment to the vehicle.

13. The adjustable steering column assembly of claim 7, wherein the assembly further comprises a mounting bracket mounted to the column-jacket assembly and defining a telescope slot parallel to the longitudinal axis.

14. The adjustable steering column assembly of claim 13, wherein the rake bracket is coupled to the mounting bracket and defines a rake slot transversely to the longitudinal axis and spaced across the column-jacket assembly from the telescope slot and generally perpendicular relative to the telescope slot.

15. The adjustable steering column assembly of claim 14, wherein the rake bolt extends transversely to the longitudinal axis through the rake slot and telescope slot and is moveable between a lock position and an adjustment position.

16. The adjustable steering column assembly of claim 7, wherein the at least one pivot bushing includes conical section.

17. The adjustable steering column assembly of claim 16, wherein the fastener is positioned onto the rake bolt and as the rake bolt is tightened the conical section of the at least one pivot bushing is pulled into the tapered pocket of the rake bracket.

18. A self-de-lashing power-rake mechanism of an adjustable steering column assembly comprising:
  a jacket;
  a rake bracket coupled to the jacket;
  a rake bolt extending through the jacket and rake bracket; and
  a fastener, being tapered, the fastener configured to be positioned onto the rake bolt and drawing the rake bolt, fastener, rake bracket, and jacket together as the fastener is tightened and seats on a tapered pocket of the rake bracket, thereby de-lashing respective interfaces defined between and among the rake bolt, fastener, rake bracket, and jacket.

* * * * *